United States Patent Office 2,820,796
Patented Jan. 21, 1958

2,820,796

PRODUCTION OF METAL-FREE PHTHALOCYANINES

Felix Frederick Ehrich, Westfield, N. J., assignor to E. I. du Pont de Nemours and Company, Wilmington, Del., a corporation of Delaware No Drawing. Application July 23, 1954
Serial No. 445,473

8 Claims. (Cl. 260—314.5)

This invention relates to the production of metal-free phthalocyanines. More particularly, it relates to an improved process for preparing metal-free phthalocyanines from the corresponding phthalic anhydrides.

The most successful methods of producing metal-free phthalocyanines, from the standpoint of yield, involve indirect operations. They involve first producing metal-containing phthalocyanines, followed by the laborious, expensive and ofttimes incomplete task of removing the metal. An example of one method is contained in U. S. 2,116,602, issued to Heilbron et al. The starting material is phthalonitrile and the metal employed is from the alkali or alkaline earth series. The use of phthalonitrile as a starting material adds another shortcoming to this process. Phthalonitrile is not simple to prepare and consequently is expensive. The last-mentioned difficulty would be present even if the metal-free phthalocyanine were prepared directly from phthalonitrile in the presence of special solvents and catalysts, as suggested in U. S. 2,116,602.

U. S. Patents Nos. 2,000,051 and 2,000,052, issued to Thorpe et al., disclose the preparation of metal-free phthalocyanine directly from orthocyanobenzamide (U. S. 2,000,051) and phthalimide (U. S. 2,000,052) by treatment with antimony. In U. S. 2,000,052 ammonia is used along with phthalimide. Thorpe et al. disclose in this patent that phthalic anhydride may also be used since the anhydride will form phthalimide by reaction with ammonia. However, the yield of metal-free phthalocyanine by the process of either patent is poor: 30–40%, based on the weight of the phthalocyanine-yielding compound, is maximum.

The so-called urea process involving phthalic anhydride as a starting material has proven economically attractive for preparing metal-containing phthalocyanines. This process is shown in U. S. 2,197,458, issued to Wyler. To prepare the metal-free phthalocyanine, it becomes necessary to demetallize. This is accompanied by the numerous difficulties previously mentioned. Some metal phthalocyanines, such as the copper, nickel and cobalt derivatives, which are easy to make via the phthalic anhydride-urea route, are very stable and practically impossible to demetallize. On the other hand, the alkali and alkaline earth metal phthalocyanines, especially magnesium phthalocyanine, which are easily demetallized, are very difficult if not impossible to make in practical yields by this route. Attempts to substitute antimony in this process, with the intention of obtaining metal-free phthalocyanines directly, have given very poor yields.

It is an object of this invention to prepare metal-free phthalocyanines of high quality directly from phthalic anhydrides. It is a further object to produce the metal-free phthalocyanines in commercially attractive yields. It is a still further object to produce metal-free phthalocyanines without adding substantially to the cost of production. Other objects will appear hereinafter.

The objects are attained by the following invention which broadly comprises heating phthalic anhydride and urea in a diluent with antimony metal, preferably in powdered form, in the presence of an ammonium halide, preferably ammonium chloride, and, preferably, in the presence of a small amount of ammonium molybdate. More specifically, the invention comprises using in the process from 1 to 2 mols of antimony, preferably 1.5 mols, and from 1.4 to 8.5 mols of ammonium chloride, preferably 4.5 mols, for every 4 mols of phthalic anhydride.

In one practical and preferred embodiment of this invention, 4 mols of phthalic anhydride and about 14 mols of urea are heated together with a small amount of ammonium molybdate in a suspension in trichlorobenzene. The ingredients are brought to a temperature of about 160° C. and held at this temperature for a short time. About 1.5 mols of powdered antimony metal (100 mesh or finer) and about 4.5 mols of ammonium chloride are then added. This is followed by heating to about 200° C. where it is held for about 5 hours.

The process of the invention is shown in more detail in the following examples:

Example I

The following ingredients are charged to a 2-liter glass reactor fitted with an anchor type agitator and a reflux condenser:

| | |
|---|---|
| Phthalic anhydride _____grams__ | 166.6 |
| Urea _____do____ | 333.2 |
| Ammonium molybdate _____do____ | 1.0 |
| Trichlorobenzene _____ml.__ | 900 |

The charge is first heated to about 155° C. over a period of about 2 hours and held between 155° C. and 160° C. for one hour. 51.5 grams of powdered antimony (100 mesh or finer) and 67.7 grams of crystalline ammonium chloride are then added, followed by heating to about 200° C. After 5 hours at 200° C. the mixture is cooled to room temperature. The solids are isolated by filtering, washing with 1000 ml. of trichlorobenzene and then washing with 1000 ml. of acetone.

The resulting paste is added to 4 liters of water containing 100 grams of sodium hydroxide and the residual solvents are removed by steam distillation. The metal-free phthalocyanine is decanted from the antimony powder, filtered and washed alkali-free. The paste is then purified by heating with 500 ml. of concentrated hydrochloric acid for ½ hour, filtered, washed with concentrated hydrochloric acid and washed free of soluble salts with water. After drying, 96.2 grams of the blue metal-free phthalocyanine of 92% purity was obtained. This amounts to 61.2% of the theoretical yield.

This product is given further conditioning to develop satisfactory pigment properties. This is done by dissolving in sulfuric acid and subsequently drowning the solution in water. Thus, 25 grams of powder is dissolved in 250 grams of 100% sulfuric acid at 0°–5° C. After stirring for about 2 hours, the cold solution is added dropwise into 2500 ml. of boiling water. The hot slurry is filtered and washed free of soluble salts. The paste is further purified by adding water, making slightly alkaline by adding sodium carbonate and then adding, while stirring, a dilute solution of sodium hypochlorite. The sodium hypochlorite is added in small amounts so that a slight excess of the hypochlorite is maintained throughout the 2-hour stirring period. The slurry is again filtered and washed free of soluble salts.

After drying, a bright greenish blue metal-free phthalocyanine pigment is obtained.

Example II

A polychloro metal-free phthalocyanine is made by using 322 g. of tetrachloro phthalic anhydride, instead of 166.6 g. of phthalic anhydride as used in Example I. The synthesis, purification and particle size reduction procedures are substantially those used in Example I.

In the conditioning procedure presented in Example I, chlorosulfonic acid is added to obtain a satisfactory solution prior to adding the cold solution to the boiling water.

The product, which is the well-known yellowish green pigment, is obtained in good yield. Its chlorine content corresponds closely to the fully chlorinated phthalocyanine.

The above examples set forth the optimum conditions for the manufacture of metal-free phthalocyanine pigments but many variations are possible within the scope of this invention.

Other than the previously mentioned use of an ammonium halide, such as ammonium chloride, as an ancillary agent, the processing may follow standard practice. Among the diluents which may be used are trichlorobenzene, orthodichlorobenzene, kerosene, naphthalene, and chloronaphthalene.

The process may be applied to phthalic anhydride to produce metal-free phthalocyanine or it may be applied to halogenated phthalic anhydrides to produce corresponding metal-free halogen-substituted phthalocyanines.

The stepwise heating cycle may be modified and still yield the desired product. The antimony metal and ammonium chloride may be added at the beginning of the heating cycle and the temperature increased at a constant rate to about 195° C. in 2–3 hours. The temperature may then be held between 185° C. and 210° C. for 3–5 hours.

Separation from the metallic antimony is easily accomplished by decantation since the metal with its high specific gravity settles rapidly. The recovered metal powder, after washing and drying, can be reused in subsequent charges. This method of separation, however, is not critical and any other convenient method can be used. Some of the antimony may be consumed during the reaction and converted to salts. These salts may be removed by solution in strong hydrochloric acid or dissolved in strong caustic soda.

The conditioning procedure may vary widely. The only requirement is that the product be completely in solution before drowning (adding to the boiling water) and that the temperature be kept low to avoid sulfonation of the phthalocyanine molecule. Other methods of particle size reduction, such as milling in an organic liquid or dry milling in a ball mill with an inorganic salt, may be used. The treatment with hypochlorite improves the intensity of the pigment but may be omitted.

My invention furnishes a simple and economical method of producing metal-free phthalocyanines in high yields directly from the corresponding phthalic anhydride. The phthalocyanine products of the invention, metal-free phthalocyanine or metal-free halogen-substituted phthalocyanine, such as the polychloro phthalocyanine, are useful in high-quality pigment pastes and powders for printing inks, textile dyeing, paper coloring, etc. The metal-free phthalocyanines are especially useful where the greenish type of blue dye is preferred for multi-colored process printing.

I claim as my invention:

1. A process for the manufacture of a metal-free phthalocyanine of the group consisting of metal-free phthalocyanine and metal-free halogen-substituted phthalocyanine which comprises heating a phthalic anhydride of the group consisting of phthalic anhydride and halogenated phthalic anhydride, and urea in a diluent with antimony metal in the presence of a controlled amount of an ammonium halide.

2. A process for the manufacture of a metal-free phthalocyanine of the group consisting of metal-free phthalocyanine and metal-free halogen-substituted phthalocyanine which comprises heating a phthalic anhydride of the group consisting of phthalic anhydride and halogenated phthalic anhydride, and urea in a diluent with antimony metal in the presence of a controlled amount of ammonium chloride.

3. A process as in claim 2 wherein the phthalic anhydride, antimony and ammonium chloride are used in the molecular proportions of 4:1–2:1.4–8.5, respectively.

4. A process as in claim 2 wherein the phthalic anhydride, antimony and ammonium chloride are used in the molecular proportions of 4:1.5:4.5, respectively.

5. A process as in claim 2 wherein tetrachloro phthalic anhydride is used to produce a polychloro phthalocyanine.

6. A process as in claim 2 wherein phthalic anhydride is used to produce metal-free phthalocyanine.

7. A process for the manufacture of a metal-free phthalocyanine of the group consisting of metal-free phthalocyanine and metal-free halogen-substituted phthalocyanine which comprises heating a phthalic anhydride of the group consisting of phthalic anhydride and halogenated phthalic anhydride, and urea in a diluent with powdered antimony metal in the presence of ammonium chloride and a small amount of ammonium molybdate.

8. A process for the manufacture of a metal-free phthalocyanine which comprises heating about 4 mols of phthalic anhydride, about 14 mols of urea, and a small amount of ammonium molybdate, said ingredients suspended in trichlorobenzene, to a temperature of about 160° C., maintaining said temperature for about 1 hour, incorporating about 1.5 mols of powdered antimony and about 4.5 mols of ammonium chloride in said suspension, heating the resulting mixture to about 200° C., and maintaining it at said temperature for about 5 hours, cooling and isolating the metal-free phthalocyanine.

References Cited in the file of this patent

UNITED STATES PATENTS

| | | |
|---|---|---|
| 2,160,837 | Detrick | June 6, 1939 |
| 2,197,458 | Wyler | Apr. 16, 1940 |
| 2,318,783 | King et al. | May 11, 1943 |